United States Patent
Ramaswamy et al.

(10) Patent No.: US 9,741,003 B2
(45) Date of Patent: Aug. 22, 2017

(54) METHOD AND SYSTEM FOR PROVIDING CENTRALIZED NOTIFICATIONS TO AN ADMINISTRATOR

(75) Inventors: Sanjay Ramaswamy, Redmond, WA (US); Jimin Jia, Beijing (CN); Qi Ren, Beijing (CN); Wenjie Liang, Beijing (CN); Michael Forney, Redmond, WA (US); Michael Butler, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 483 days.

(21) Appl. No.: 13/330,476

(22) Filed: Dec. 19, 2011

(65) Prior Publication Data
US 2013/0154916 A1 Jun. 20, 2013

(51) Int. Cl.
G06F 15/173 (2006.01)
G06Q 10/06 (2012.01)
G06F 11/30 (2006.01)
H04L 12/26 (2006.01)

(52) U.S. Cl.
CPC ..... *G06Q 10/0633* (2013.01); *G06F 11/3051* (2013.01); *H04L 43/04* (2013.01)

(58) Field of Classification Search
None
See application file for complete search history.

(56) References Cited

U.S. PATENT DOCUMENTS

| | | | | |
|---|---|---|---|---|
| 6,021,262 A * | 2/2000 | Cote | ............. | G06F 11/0781 709/223 |
| 7,237,019 B2 * | 6/2007 | Sogabe | ............. | G06F 11/32 379/100.05 |
| 7,257,200 B2 * | 8/2007 | Valeriano | ............. | H04L 67/26 379/88.12 |
| 7,548,955 B2 * | 6/2009 | Nicholas, III | ............. | G06F 3/04812 709/206 |

(Continued)

OTHER PUBLICATIONS

Stephen E. Hansen, et al.; "Automated System Monitoring and Notification With Swatch;" In Proceedings: 7th USENIX conference on System administration; Nov. 1-5, 1993, pp. 101-108. http://citeseerx.ist.psu.edu/viewdoc/download?doi=10.1.1.43.7975&rep=rep1&type=pdf.

*Primary Examiner* — Joseph E Avellino
*Assistant Examiner* — Phyllis A Book

(57) ABSTRACT

Embodiments of the present disclosure provide a user interface that enables an administrator to monitor the status of one or more long-running processes executing on a system. According to one or more embodiments, information about the long-running processes is received, analyzed and converted into a single format. This information is then stored in a storage device in the single format. In response to a command request periodically received from a user interface, summary information about the one or more long-running processes is provided to, and displayed on, the user interface. Upon receipt of a user selection of at least a portion of the summary information, the user interface issues a second command request that is similar to the first (Continued)

command request, but includes additional parameters, to retrieve additional information about the selected summary information. Once the additional information is received, the additional information is presented on the user interface.

20 Claims, 9 Drawing Sheets

(56) References Cited

U.S. PATENT DOCUMENTS

| | | | | |
|---|---|---|---|---|
| 7,925,984 | B2* | 4/2011 | Awe | H04L 41/046 715/744 |
| 2002/0026503 | A1 | 2/2002 | Bendinelli | |
| 2002/0188711 | A1* | 12/2002 | Meyer | G06F 3/0605 709/223 |
| 2003/0120775 | A1* | 6/2003 | York | H04L 12/2602 709/224 |
| 2007/0294369 | A1* | 12/2007 | Ginter | G06F 21/55 709/217 |
| 2008/0098108 | A1* | 4/2008 | Yu | G06Q 30/02 709/224 |
| 2008/0255919 | A1* | 10/2008 | Gorder | G06Q 10/06 705/7.13 |
| 2009/0077229 | A1* | 3/2009 | Ebbs | G08G 1/207 709/224 |
| 2009/0132589 | A1* | 5/2009 | Daos | H04L 43/16 |
| 2009/0177597 | A1* | 7/2009 | Dube | G06F 21/552 706/12 |
| 2010/0161362 | A1* | 6/2010 | Shapira | G06Q 10/00 705/7.11 |
| 2012/0011459 | A1* | 1/2012 | Ocampo et al. | 715/771 |
| 2012/0185587 | A1* | 7/2012 | O'Sullivan | G06F 11/004 709/224 |

* cited by examiner notifications moving 4 mailboxes (1 of 4 complete)
importing 1 PST (0 of 1 complete)
exporting 2 PSTs (0 of 2 complete)
provisioning 5 mailboxes (0 of 5 complete)

400A

4 MOVES ×

Mailbox: John Doe
Started by: Administrator
Started at: 10/10/2010 8pm PST
Status: Queued Mailbox: Max Doe
Started by: Administrator
Started at: 10/10/2010 6pm PST
Status: Queued Mailbox: Bill Doe
Started by: Administrator
Started at: 10/10/2010 6pm PST
Status: Queued Mailbox: mbxB
Started by: Administrator
Started at: 10/9/2010 9pm PST
Status: Complete

420

FIG. 4B notifications moving 3 mailboxes (1 of 3 complete, 1 failed)
importing 1 PST (1 of 1 complete)
exporting 2 PSTs (2 of 2 complete)
provisioning 5 mailboxes (2 of 5 complete)

400A

3 MOVES                                                      ×

Mailbox:      John Doe
Started by:   Administrator
Started at:   10/10/2010 8pm PST
Status:       Failed - view errors....    — 450

Mailbox:      Max Doe
Started by:   Administrator
Started at:   10/10/2010 6pm PST
Status:       100% complete Mailbox:      Bill Doe
Started by:   Administrator
Started at:   10/10/2010 6pm PST
Status:       25% complete

METHOD AND SYSTEM FOR PROVIDING CENTRALIZED NOTIFICATIONS TO AN ADMINISTRATOR

BACKGROUND

Often times, network administrators need to monitor various long-running operations as part of their day-to-day duties. However, current user interfaces are ill-equipped to notify the administrator when a problem arises with a long-running operation or when a particular long-running operation is complete. Additionally, each of the long-running operations may have different reporting processes that require an administrator to navigate to a command line and manually monitor the status of each long-running operation.

It is with respect to these and other general considerations that embodiments of the present disclosure have been made. Although relatively specific problems have been discussed, it should be understood that the embodiments disclosed herein should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide a user interface that enables an administrator to monitor the status of one or more long-running processes that are executing on a system. According to one or more embodiments, information about the one or more long-running processes is received. Once the information is received, the information is analyzed and converted into a single format and stored in a storage device in the single format. In response to a command request periodically received from a user interface, summary information about the one or more long-running processes is provided to, and displayed on, the user interface. Upon receipt of a user selection of at least a portion of the summary information, the user interface issues a second command request that is similar to the first command request, but includes additional parameters, to retrieve additional information about the selected summary information. Once the additional information is received, the additional information is presented on the user interface.

Embodiments may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

FIGS. 4A-4D illustrate portions of an exemplary user interface for displaying summary information and additional information about one or more long-running processes according to one or more embodiments.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
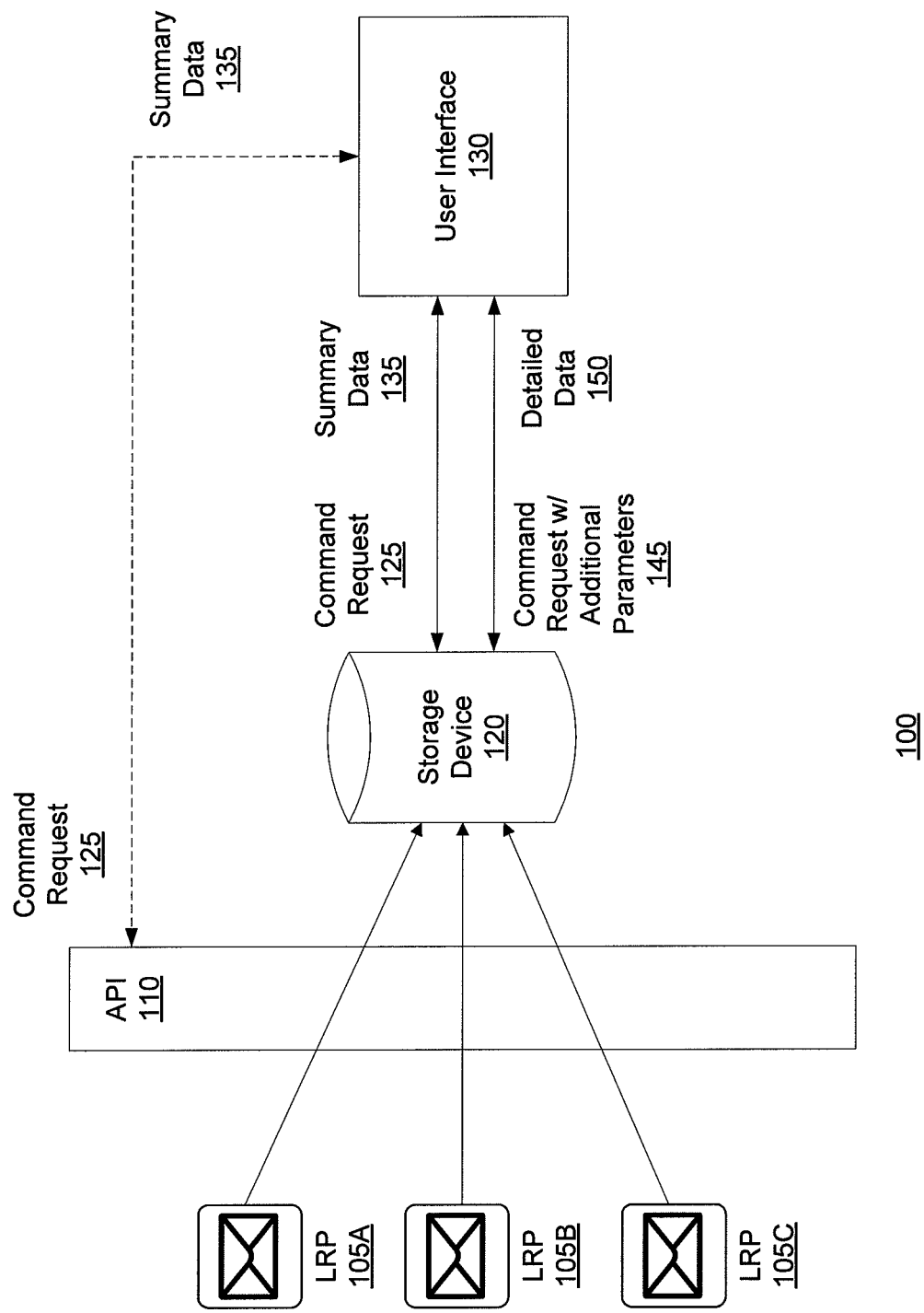
FIG. 1 illustrates a system for providing information about one or more long-running processes according to one or more embodiments.

FIG. 1 illustrates a system 100 for providing information about one or more long-running processes 105A, 105B and 105C and providing that information on a user interface 130. In certain embodiments, system 100 may be running MICROSOFT EXCHANGE by Microsoft Corporation of Redmond, Wash. The information provided to the user or the administrator may include service notices, alerts, status information and the like. In addition to providing the information to a user or an administrator via the user interface 130, additional embodiments provide that the information may be communicated to the user or administrator via an electronic message.

As shown in FIG. 1, system 100 may include a plurality of long-running processes 105A, 105B and 105C. In certain embodiments, each of the long-running processes 105A, 105B and 105C may be executing on one more computing devices (not shown). Additionally, data from each of the long-running processes may be communicated to a storage device 120 through a network or internet connection. In another embodiment, each of the long-running processes 105A, 105B, and 105 may be executing on a server (not shown) or other computing device along with one or more of an application programming interface (API) 110, a storage device 120 and/or a user interface 130. Although three long-running processes are shown, it is contemplated that the system 100 may provide information for fewer or additional long-running processes. Additionally, it is contemplated that each of the long-running processes 105A, 105B and 105C may be different long-running processes, or different instances of the same long-running processes. Furthermore, each of the long-running processes 105A, 105B and 105C may be executed concurrently or sequentially. In certain embodiments, long-running processes 105A, 105B and 105C include mailbox provisioning (e.g., comma-separated values (CSV) imports), mailbox migration, personal storage table (PST) imports and exports, upcoming certificate expiry notifications and the like.

Although long-running processes are specifically mentioned, it is contemplated that the system and methods described herein may be used to track progress information on any number of processes, whether long-running or not. Additionally, it is contemplated that each of the long-running processes may be completed in various stages or at various time intervals. For example, some long-running processes may take several hours to complete while other long-running processes may take several minutes to complete.

Referring back to FIG. 1, an administrator or user of system 100 may initiate execution of one or more long-running processes 105A, 105B and 105C. As discussed above, each of the long-running processes 105A, 105B and 105C may be used to perform different functions and each of the long-running processes 105A, 105B and 105C may be provided by a different back-end service. For example, long-running process 105A may be a PST import for a first user, long-running process 105B may be a CSV import for a second user, and long-running process 105C may be a mailbox migration for the first user, the second user and a third user. As each long-running process performs a different function, data corresponding to the status of each long-running process may be formatted in a manner that is unique to that particular long-running process. Additionally, each long-running process may take anywhere from a few minutes to a few hours to complete. Based on the above, it is impractical for a user or an administrator to continuously watch multiple user interfaces for status updates for each long-running process.

As such, system 100 includes an API 110 that is configured to provide periodic updates about each long-running process 105A, 105B and 105C regardless of the processing time of each of the long-running processes 105A, 105B and 105C and regardless of the type and format of the data received from each of the long-running processes 105A, 105B and 105C. In certain embodiments, the API 110 may be included in the storage device 120. In another embodiment, the API 110 may be included on a server or other computing device (not shown) that communicates with the storage device 120 over an internet or network connection.

Once this information is received by the API 110, the data is stored in a storage device 120 in a unified or generic format so the information about each of the long-running processes 105A, 105B and 105C may be presented to a user in a single user interface 130. As will be discussed in detail below, once the information about each long-running process 105A, 105B and 105C is stored in the storage device 120, the user interface 130 may submit a single command request 125 to the storage device 120 to receive summary information 135 about each of the long-running processes 105A, 105B and 105C.

In another embodiment, the user interface 130 may submit a command request 125 directly to the API 110 for the information about each of the long-running processes 105A, 105B and 105C. In response to the command request 125, the API 110 may provide summary information 135 or other data to the user interface 130 without requiring the user interface 130 to wait for the API 110 to periodically update the storage device 120. In still yet another embodiment, the API 110 may communicate summary information 135 directly to the user interface 130 when the status of a long-running process has changed such that an immediate notification is warranted. For example, the user interface 130 may either request or be provided status information directly from the API 110 when: (i) a long-running process has been stopped, (ii) a long-running process has been removed from the system 100, (iii) a long-running process has been completed, or (iv) upon occurrence of another event in which the administrator or user of the system 100 should immediately be notified.

As briefly discussed above, the API 110 is configured to provide ongoing, periodic updates to the storage device 120 about each of the long-running processes 105A, 105B and 105C. As part of this process, as data from the API 110 is stored in the storage device 120, a determination is made as to whether: (i) the received data is for a new long-running process; or (ii) the data is from an existing long-running process. If the data received from the API 110 is for a new long-running process (e.g., a long-running processes newly initiated by a user or administrator of the system 100), the newly received data will be inserted as a new record into the storage device 120. However, if the received data is from an existing long-running process, the data received from the API 110 is updated in the storage device. Additionally, if it is determined that data stored in the storage device 120 exceeds a particular time threshold set by the administrator or other user (e.g., the data two days old), that data may be overwritten by new data, either from the same long-running process or by data from a newly initiated long-running process.

In certain embodiments, the API 110 may also be configured to independently send out electronic messages (e.g., via e-mail, MMS, SMS, and the like) whenever each of the plurality of long-running processes 105A, 105B and 105C has a note-worthy status update. For example, if long-running process 105A encountered an error, the API 110 may immediately send an electronic notification to the administrator of the system 100 to notify the administrator of the error. As a result, the administrator or user of the system 100 receives the notification shortly after the error occurs without having to wait for the user interface 130 to be updated.

As discussed above, information regarding the status of each long-running process 105A, 105B and 105C may have a unique format. Accordingly, storage device 120 is configured to analyze and convert the format of all data received from each long-running process 105A, 105B and 105C into a single, unified format. Because the data from each long-running process 105A, 105B and 105C is converted into a uniform format, a single user interface, such as user interface 130, and a single command request, such as command request 125, may be used to access and display data corresponding to each long-running process.

In certain embodiments, the storage device 120 is simple and lightweight and may be available on a per-tenant basis. Thus, each user or administrator may configure the storage device 120 based on user preferences. Additionally, each user or administrator may have access to various functionalities based on user credentials or permissions of the user or administrator. In embodiments where system 100 is running MICROSOFT EXCHANGE, the storage device 110 may be an Arbitration Mailbox (ARB-MBX) that is typically used for managing approval workflow.

In order to convert the data from each long-running process into a single, unified format, the storage device 120 includes one or more data fields that provide information about each long-running process 105A, 105B and 105C. For example, the data fields may include information regarding (i) who started the long-running process, (ii) when the long-running process was started, and (iii) various data points that track the status of each long-running process 105A, 105B and 105C. Although specific data fields were specifically discussed, a more detailed listing of possible data fields is included in Table 1 below. It is also contemplated that an administrator of the system 100 may add or remove data fields based on the administrator's preference.

TABLE 1

| | | |
|---|---|---|
| StoreID | ID | Represents an item in the ARB_MBX |
| Identity | IDENTITY | Represents an instance of a long-running process |
| DisplayName | STRING | Represents the value of the object that the process instance is operating on, such as "John Doe" |
| StartedBy | RECIPIENT | Represents who initiated the process; could be used to provide per-user filtered views |
| Type | STRING | Local Move\|Remote Move\|Import PST\|Export PST\|Provisioning\|etc. |
| StartTime | DATETIME | Represents when the process was initiated |
| LastModified | DATETIME | Represents timestamp of process activity |
| Status | ENUM | Queued\|In Progress\|Suspended\|Completed\|Failed\|etc. |
| Message | STRING | Represents a short status description/message for process activity; this could also be a short failure description if the process failed |
| PercentComplete | INTEGER | Indicates the completion percentage of the process |
| Report | STRING | Represents the complete log of a process |
| ExtendedData | ARRAY | Name-value pairs of any extended data that needs to be sent out via e-mail-notifications |

System 100 also includes a user interface 130 that is configured to show status updates and information about one or more long-running processes such as, long-running processes 105A, 105B and 105C. In an embodiment, the user interface 130 may be part of a computing device that is remote from the other components of the system 100. For example, the user interface may be located on a client computing device and communicate with the storage device 120 and/or the API 110 via a network or internet connection. In another embodiment, the user interface 130, the storage device 120, the API 110 and/or one or more of the long-running processes 105A, 105B and 105C may be part of the same computing device.

The user interface 130 may periodically submit a single command request 125 to the storage device 120 to obtain status information for each of the long-running processes 105A, 105B and 105C. In response to the command request 125, the storage device 120 communicates summary information 135 about each long-running process to the user interface 130. In certain embodiments, the summary information 135 includes basic information about each of the long-running processes 105A, 105B and 105C. For example, the summary information 135 may include the type of long-running processes (e.g., exporting a PST file) currently running on the system 100 and the status (e.g., completion percentage) of each of the long-running processes 105A, 105B and 105C.

In response to an administrator selecting at least a portion of the summary information 135 that is provided on the user interface 130, the user interface 130 submits a command request 145 to the storage device 120. In certain embodiments, the command request 145 is the same command request 125 that was previously communicated to the storage device 110 by the user interface 130 to obtain the summary information 135. However, the command request 145 also includes additional parameters that correspond to additional information that is stored by the storage device 120. For example, using the data fields from Table 1 above, the additional information may include (i) the start time (e.g., StartTime), (ii) who initiated the long-running process (e.g., StartedBy), and (iii) when the data was modified (e.g., LastModified). Although specific fields were mentioned, it is contemplated that additional information may be presented based on preferences received by the user interface 130. Once the additional information is retrieved from the storage device 120, the detailed data 150 is communicated to the user interface 130 and displayed.

In addition to providing visual notifications via a user interface 130, system 100 may also be configured to provide e-mail or other electronic notifications about the status of one or more long-running processes 105A, 105B and 105C. In certain embodiments, each e-mail or electronic message may include contextual information about the status of one or more of the long-running processes 105A, 105B and 105C and/or errors encountered by one or more of the long-running processes 105A, 105B and 105C. The e-mail or electronic message may also include actionable links that enable the recipient of the electronic message to address an error or other problem with the one or more long-running processes 105A, 105B and 105C.

For example, the API 110 may be configured to communicate an electronic message to the administrator (based on preferences set by the administrator) when a long-running process starts, completes, or fails. In certain embodiments, the electronic notification includes context, content and/or actionable links that enable the recipient to address each particular status update. Using the actionable links, the recipient may be able to: (i) determine the cause of the error; (ii) restart one or more long-running processes that encountered the error; or (iii) start a new long-running process.

Figure 2:
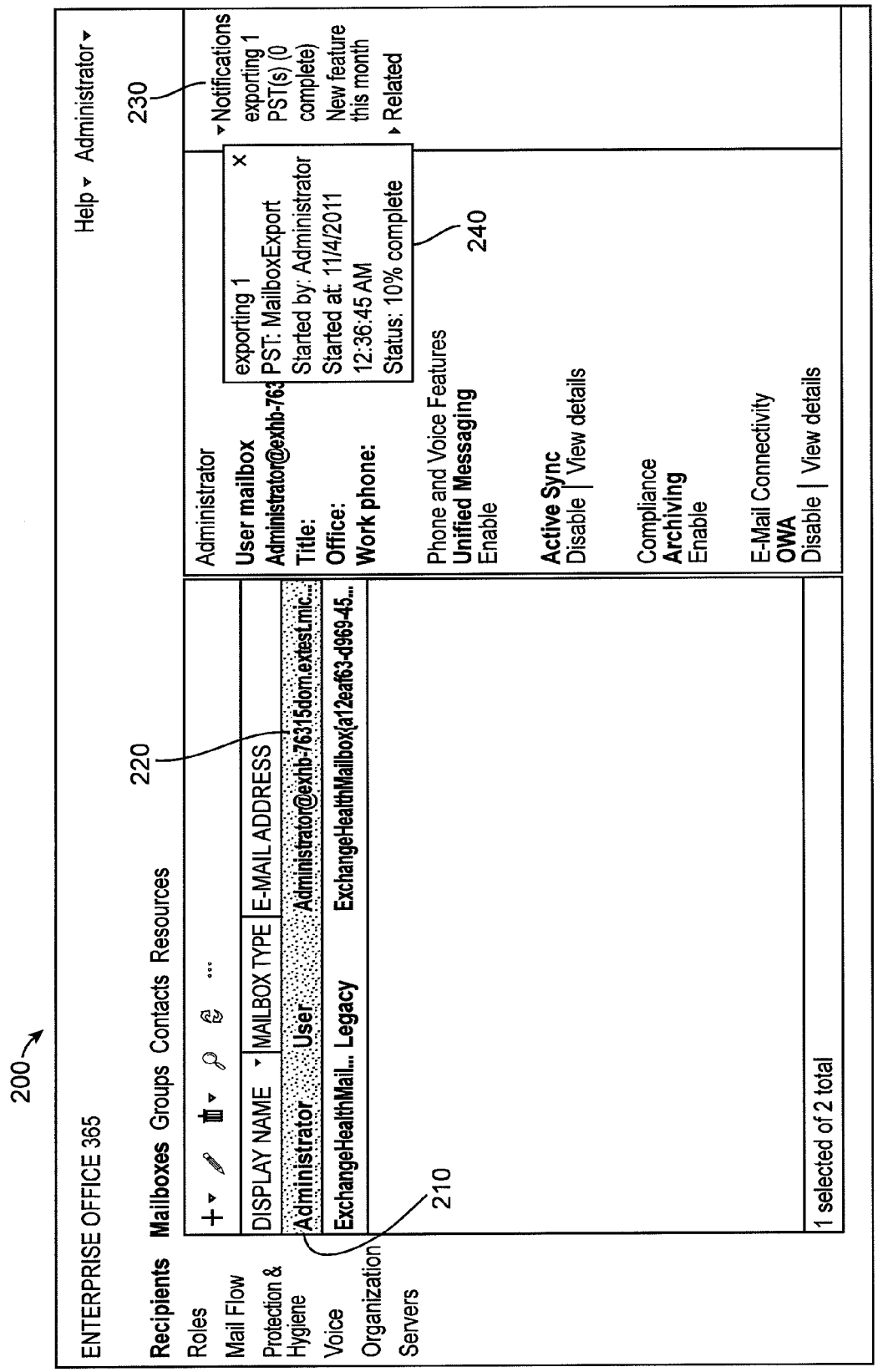
FIG. 2 is an exemplary user interface for displaying information about one or more long-running processes according to one or more embodiments.

Referring to FIG. 2, FIG. 2 illustrates an exemplary user interface 200 for presenting status information about one or more long-running processes. As shown in FIG. 2, the user interface 200 includes information (such as entry 210) about users of the system as well as the contact information 220 for each user. As discussed above, the contact information 220 may be used by the system, or by components of the system (such as the API 110 (FIG. 1)), to communicate updated status information about one or more long-running processes to an administrator or other user.

As shown in FIG. 2, the user interface 200 may include a "Notifications" pane 230 in which information about each long-running process may be displayed. As shown in the exemplary user interface 200, an entry 210 indicates that an "Administrator" has initiated a single long-running process, exporting a PST file, the information of which is displayed in the "Notifications" pane 230. The user interface 200 also shows that the single long-running process that was initiated has not yet been completed (indicated by the "0 complete" text notification). However, user interface 200 also makes it possible to retrieve and display additional information, such as a percentage of the long-running process that is complete, by permitting selection of a portion of the summary information in the "Notifications" pane 230. In response to receiving the selection, the user interface issues a command to storage device to obtain additional information about the selected long-running process. Once the additional information is retrieved from the storage device, a fly-out window 240 displays the additional information.

For example, as shown in fly-out window 240, the PST export was started by an "Administrator" at 12:36 AM on Nov. 4, 2011, and is 10% complete. Although only one long-running process is displayed in the "Notifications" pane 230, it is contemplated that additional long-running processes, along with corresponding fly-out windows 240, may be concurrently displayed.

Figure 3A:
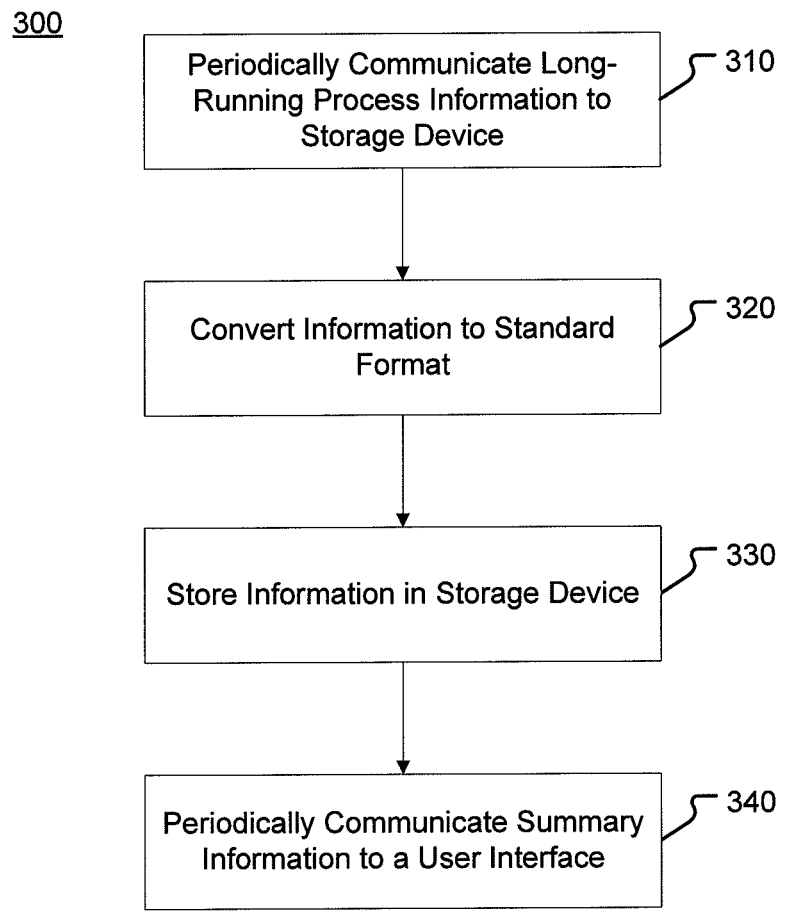
FIGS. 3A-3B illustrate methods for providing information about one or more long-running processes according to one or more embodiments.

FIG. 3A illustrates a method 300 for providing information about one or more long-running processes to a storage device according to one or more embodiments. In certain embodiments, one or more components of a system, such as system 100 (FIG. 1), may employ the method 300 to retrieve and provide status information about one or more long-running processes that are being executed on the system.

Method 300 begins at operation 310 in which information about one or more long-running processes is periodically provided to a storage device. In certain embodiments, the information about each long-running process is periodically communicated to the storage device by an application programming (API). In an embodiment, a selection of a timeframe between each communication may be received through a user interface.

Flow then passes to operation 320 in which the long-running process information is converted in to a standard format. In an embodiment, the API may be configured to convert the information from a first format into a unified standard format that is accepted by the storage device. In another embodiment, the storage device may be configured to analyze and format the received data. Once the long-running process information has been formatted, the long-running process information is stored 330 in the storage device.

Operation 340 provides that summary information for each long-running process is periodically communicated to a user interface. In certain embodiments, the summary information may be provided to the user interface using a push or pull model. The summary information may include each type of long-running process currently being executed as well as the status of each long-running process. In certain embodiments, the information displayed in the summary information may be customizable based on selections received through the user interface.

In embodiments, the summary information is communicated from the storage device to the user interface in response to a command issued from the user interface. In yet another embodiment, the user interface may issue a command request directly to the API and receive updated status information about a particular long-running process. It is also contemplated that the API or the storage device may be configured to communicate updated status information directly to the user interface without receiving a request to do so, such as periodically or when it is determined that the administrator or user should immediately be notified of a status of one or more long-running processes.

Figure 3B:
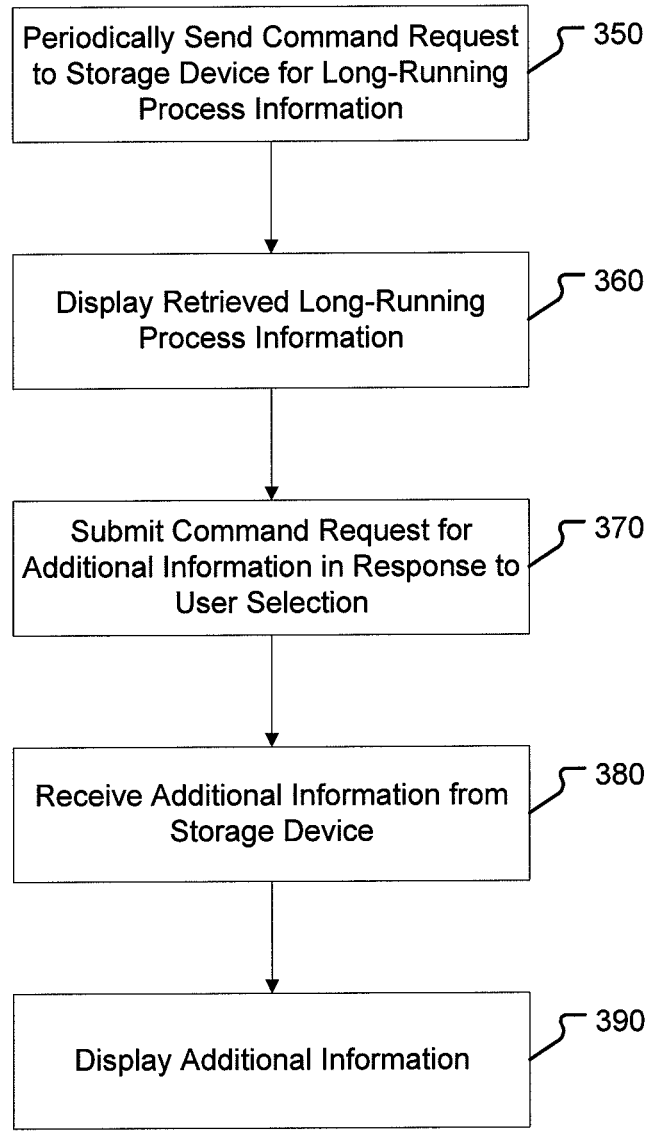

FIG. 3B illustrates a method 345 for displaying information about one or more long-running processes according to one or more embodiments. In certain embodiments, method 345, or portions thereof, may be executed concurrently with method 300 described above. In another embodiment, method 345, or portions thereof, may be executed sequentially with respect to method 300.

Method 345 begins at operation 350 in which a user interface periodically sends a command request to a storage device for information about one or more long-running processes. Once the information is received, the user interface displays 360 summary information about one or more of the long-running processes.

Once the summary information is displayed 360 on the user interface, the user interface submits 370 a command request for additional information in response to receiving a selection of at least a portion of the summary information corresponding to at least one long-running process. In certain embodiments, the command request is the same command request is the same command request that was previously communicated to the storage device or the API by the user interface to obtain the summary information. However, this second command request also includes additional parameters that correspond to additional information that is stored by the storage device.

Flow then proceeds to operation 380 in which the additional information is retrieved from the storage device (or the API) and the additional information is displayed 390 on the user interface. In certain embodiments, the additional information may include information corresponding to the data fields described above in Table 1. As was explained above, the additional information may be displayed in the user interface in one or more fly-out windows.

FIGS. 4A-4D illustrate exemplary portions of a user interface for providing status information about one or more long-running processes according to one or more embodiments. In the following example, an administrator, ("ADMIN1") of the system, such as, for example, system 100 (FIG. 1), initiates the following long-running processes: (i) three local moves, initiated on Oct. 10, 2010 at 10:00 AM (represented by Identities 11, 12, 13 in the following tables); (ii) one import PST, initiated on Oct. 10, 2010 at 10:01 AM (represented by Identity 14 in the following tables); (iii) two export PSTs, initiated on Oct. 10, 2010 at 10:05 AM (represented by Identities 15 and 16 in the following tables); and (iv) five mailbox provisions via bulk import, initiated on Oct. 10, 2010 at 10:05 AM (represented by Identities 17, 18, 19, 20 and 21 in the following tables).

Based on the above information, a data table (having the data fields set forth in Table 1 above) of a storage device, such as, for example, storage device 120 (FIG. 1) includes the following data:

TABLE 2

| Identity | StartedBy | Type | StartTime | Display Name | Report | LastModified | Status | Message | Percent Complete |
|---|---|---|---|---|---|---|---|---|---|
| 5 | ADMIN1 | Local Move | Oct 8, 2010 8:00 PM | mbxA | . . . | Oct 8, 2010 11:00 PM | Completed | Completed move for mbxA | 100 |
| 6 | ADMIN1 | Local Move | Oct 9, 2010 9:00 PM | mbxB | . . . | Oct 10, 2010 01:00 AM | Completed | Completed move for mbxB | 100 |
| 11 | ADMIN1 | Local Move | Oct 10, 2010 10:00 AM | John Doe | . . . | Oct 10, 2010 10:01 AM | Queued | Queued move for JohnDoe | 0 |
| 12 | ADMIN1 | Local Move | Oct 10, 2010 10:00 AM | Max Doe | . . . | Oct 10, 2010 10:01 AM | Queued | Queued move for MaxDoe | 0 |

TABLE 2-continued

| Identity | StartedBy | Type | StartTime | Display Name | Report | LastModified | Status | Message | Percent Complete |
|---|---|---|---|---|---|---|---|---|---|
| 13 | ADMIN1 | Local Move | Oct 10, 2010 10:00 AM | Bill Doe | ... | Oct 10, 2010 10:01 AM | Queued | Queued move for BillDoe | 0 |
| 14 | ADMIN1 | Import PST | Oct 10, 2010 10:01 AM | mbxF | ... | Oct 10, 2010 10:02 AM | Queued | Queued Import PST into mbxF | 0 |
| 15 | ADMIN1 | Export PST | Oct 10, 2010 10:05 AM | mbxG | ... | Oct 10, 2010 10:02 AM | Queued | Queued Export PST from mbxG | 0 |
| 16 | ADMIN1 | Export PST | Oct 10, 2010 10:05 AM | mbxH | ... | Oct 10, 2010 10:02 AM | Queued | Queued Export PST from mbxH | 0 |
| 17 | ADMIN1 | Provisioning | Oct 10, 2010 10:10 AM | mbxJ | ... | Oct 10, 2010 10:05 AM | Queued | Queued provisioning for MbxJ | 0 |
| 18 | ADMIN1 | Provisioning | Oct 10, 2010 10:10 AM | mbxK | ... | Oct 10, 2010 10:05 AM | Queued | Queued provisioning for MbxK | 0 |
| 19 | ADMIN1 | Provisioning | Oct 10, 2010 10:10 AM | mbxL | ... | Oct 10, 2010 10:05 AM | Queued | Queued provisioning for MbxL | 0 |
| 20 | ADMIN1 | Provisioning | Oct 10, 2010 10:10 AM | mbxM | ... | Oct 10, 2010 10:05 AM | Queued | Queued provisioning for MbxM | 0 |
| 21 | ADMIN1 | Provisioning | Oct 10, 2010 10:10 AM | mbxN | ... | Oct 10, 2010 10:05 AM | Queued | Queued provisioning for MbxN | 0 |

Continuing with the example, if the time is now 11:30 PM on Oct. 10, 2010 and the user interface issues a command, the storage device or an API provides the following data to the user interface:

TABLE 3

| Type | Count | Completed | Failed Count |
|---|---|---|---|
| Local Move | 4 | 1 | 0 |
| Import PST | 1 | 0 | 0 |
| Export PST | 2 | 0 | 0 |
| Provisioning | 5 | 0 | 0 |

Figure 4A:
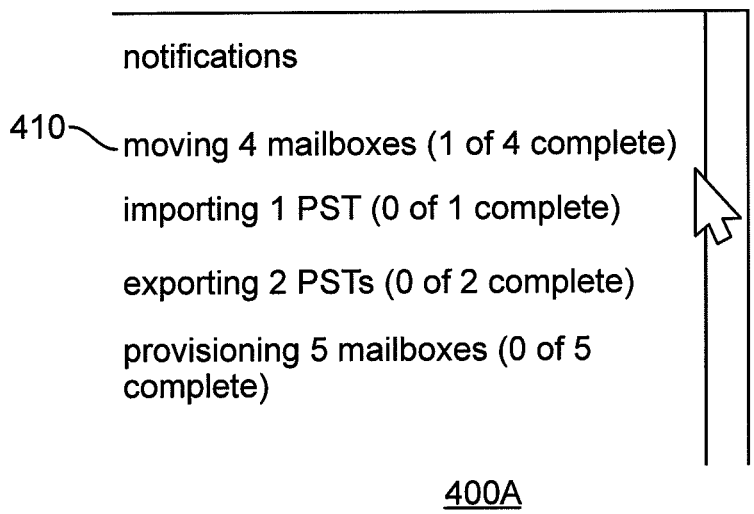

Once the information is Table 3 is received at the user interface, the user interface updates or populates a "Notifications" pane 400A (FIG. 4A). As shown, the "Notifications" pane 410 displays summary information that: (i) four mailboxes are being moved with one move completed; (ii) one PST import with zero imports completed; (iii) two PST exports with zero completed; and (iv) five mailbox provisions with zero completed.

Continuing with the example, selection of the "moving 4 mailboxes" item 410 in the "Notifications" pane 400A causes additional information about the status of mailbox moves to be retrieved. In response to receiving the selection, the user interface issues a command request to the storage device that includes parameters for the additional information. In response to the command for the additional information, the information shown in Table 4, among other information, is returned from the storage device.

TABLE 4

| Identity | StartedBy | StartTime | Message | Precent-Complete |
|---|---|---|---|---|
| 6 | ADMIN1 | Oct. 9, 2010 9:00 PM | Completed | 100 |
| 11 | ADMIN1 | Oct. 10, 2010 10:00 AM | Queued | 0 |
| 12 | ADMIN1 | Oct. 10, 2010 10:00 AM | Queued | 0 |
| 13 | ADMIN1 | Oct. 10, 2010 10:00 AM | Queued | 0 |

Once the information in Table 4 has been received by the user interface, a fly-out window 420 (FIG. 4B) containing the additional information is output on the user interface. As shown in FIG. 4B, the fly-out window shows additional information about each long-running process, such as: (i) the owner of the mailbox being moved (e.g., John Doe, Max Doe etc.); (ii) who started the mailbox move (e.g., the Administrator); (iii) when the mailbox move was initiated (e.g., Oct. 10, 2010 at 8 PM PST, Oct. 10, 2010 at 6 PM PST, etc.); and (iv) the status of each move (e.g., queued, complete etc.).

Continuing with the example, at around 10:10 AM on Oct. 10, 2010, the following changes occurred on each of the long-running processes: (i) one local move (Identity 11) was completed; (ii) one local move (Identity12) is in progress with 25% being complete; (iii) one local move (Identity13) having failed; (iv) one import PST was completed (Identity14); (v) two export PSTs were completed (Identities 15 and 16); and (vi) two mailboxes provisions were completed (Identities 17 and 18) with the remaining three (Identities 19, 20 and 21) still in progress at 10% complete, 20% complete, and 30% complete respectively.

Based on the above information, the new data in the data table of the storage device is as follows:

TABLE 5

| Identity | StartedBy | Type | StartTime | Display Name | Report | LastModified | Status | Message | Percent Complete |
|---|---|---|---|---|---|---|---|---|---|
| 5 | ADMIN1 | Local Move | Oct 8, 2010 8:00 PM | mbxA | ... | Oct 8, 2010 11:00 PM | Completed | Completed move for mbx10 | 100 |
| 6 | ADMIN1 | Local Move | Oct 9, 2010 9:00 PM | mbxB | ... | Oct 10, 2010 01:00 AM | Completed | Completed move for mbx11 | 100 |
| 11 | ADMIN1 | Local Move | Oct 10, 2010 10:00 AM | John Doe | ... | Oct 10, 2010 10:10 AM | Completed | Completed move for JohnDoe | 100 |
| 12 | ADMIN1 | Local Move | Oct 10, 2010 10:00 AM | Max Doe | | | In Progress | Move in progress for MaxDoe | 25 |
| 13 | ADMIN1 | Local Move | Oct 10, 2010 10:00 AM | Bill Doe | ... | Oct 10, 2010 10:10 AM | Failed | Too many bad items in BillDoe | 100 |

TABLE 5-continued

| Identity | StartedBy | Type | StartTime | Display Name | Report | LastModified | Status | Message | Percent Complete |
|---|---|---|---|---|---|---|---|---|---|
| 14 | ADMIN1 | Import PST | Oct 10, 2010 10:01 AM | mbxF | ... | Oct 10, 2010 11:10 AM | Completed | Completed Import PST into mbxF | 100 |
| 15 | ADMIN1 | Export PST | Oct 10, 2010 10:05 AM | mbxG | ... | Oct 10, 2010 11:10 AM | Completed | Completed Export PST into mbxG | 100 |
| 16 | ADMIN1 | Export PST | Oct 10, 2010 10:05 AM | mbxH | ... | Oct 10, 2010 11:10 AM | Completed | Completed Export PST into mbxH | 100 |
| 17 | ADMIN1 | Provisioning | Oct 10, 2010 10:10 AM | mbxJ | ... | Oct 10, 2010 10:20 AM | Completed | Completed provisioning of mbxJ | 100 |
| 18 | ADMIN1 | Provisioning | Oct 10, 2010 10:10 AM | mbxK | ... | Oct 10, 2010 10:25 AM | Completed | Completed provisioning of mbxK | 100 |
| 19 | ADMIN1 | Provisioning | Oct 10, 2010 10:10 AM | mbxL | ... | | In Progress | Provisioning in progress for mbxL | 10 |
| 20 | ADMIN1 | Provisioning | Oct 10, 2010 10:10 AM | mbxM | ... | | In Progress | Provisioning in progress for mbxM | 20 |
| 21 | ADMIN1 | Provisioning | Oct 10, 2010 10:10 AM | mbxN | ... | | In Progress | Provisioning in progress for mbxN | 30 |

In response to a command issued by the user interface, and assuming the current time is 7:00 AM on Oct. 12, 2010, the storage device provides the user interface the following data:

TABLE 6

| Type | Count | Completed | Failed Count |
|---|---|---|---|
| Local Move | 3 | 1 | 1 |
| Import PST | 1 | 1 | 0 |
| Export PST | 2 | 1 | 0 |
| Provisioning | 5 | 2 | 0 |

Figure 4C:
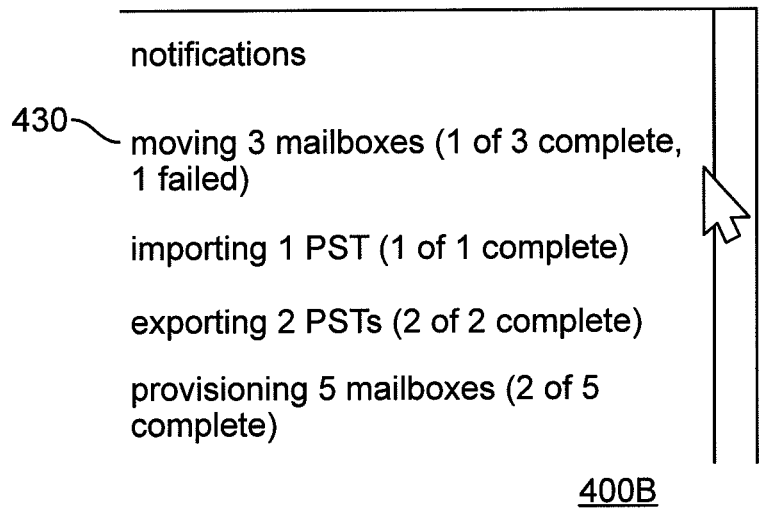

Once the information is Table 6 is received at the user interface, the user interface updates the "Notifications" pane 400B (FIG. 4C). As shown, the "Notifications" pane 400B now shows summary information that: (i) three mailboxes are being moved with one move completed and one move having failed; (ii) one PST import with one completed; (iii) two PST exports with two completed; and (iv) five mailbox provisions with two completed. Note that because the local move of mbxB (represented by Identity 6 in Table 2) is older than two days old (e.g., a selected time threshold), the information about mailbox mbxB is no longer stored in the storage device or displayed on the "Notifications" pane 400B.

Continuing with the example above, selection of the "moving 3 mailboxes" item 430 (FIG. 4C) in the "Notifications" pane 400B causes additional information about the status of mailbox moves to be retrieved. In response to receiving the selection, the user interface issues a command request to the storage device that includes parameters for the additional information. In response to the command for the additional information, the information shown in Table 7, among other information, is returned from the storage device.

TABLE 7

| Identity | StartedBy | StartTime | Message | PrecentComplete |
|---|---|---|---|---|
| 11 | ADMIN1 | Oct. 10, 2010 10:00 AM | Completed | 100 |
| 12 | ADMIN1 | Oct. 10, 2010 10:00 AM | In Progress | 25 |
| 13 | ADMIN1 | Oct. 10, 2010 10:00 AM | Too Many Bad Items in Bill Doe | 100 |

Once the information in Table 7 has been received by the user interface, a fly-out window 440 (FIG. 4D) that displays the additional information is output on the user interface. As shown in FIG. 4D, the fly-out window shows additional information about each long-running process, such as: (i) the owner of the mailbox being moved (e.g., John Doe, Max Doe etc.); (ii) who started the mailbox move (e.g., the Administrator); (iii) when the mailbox move was initiated (e.g., Oct. 10, 2010 at 8 PM PST, Oct. 10, 2010 at 6 PM PST, etc.); and (iv) the status of each move (e.g., queued, percentage complete, failed etc.). In situations where the long-running process failed, receipt of a selection of the notification 450 causes additional details to be received, such as, for example, details as to why the particular long-running process failed.

Figure 5:
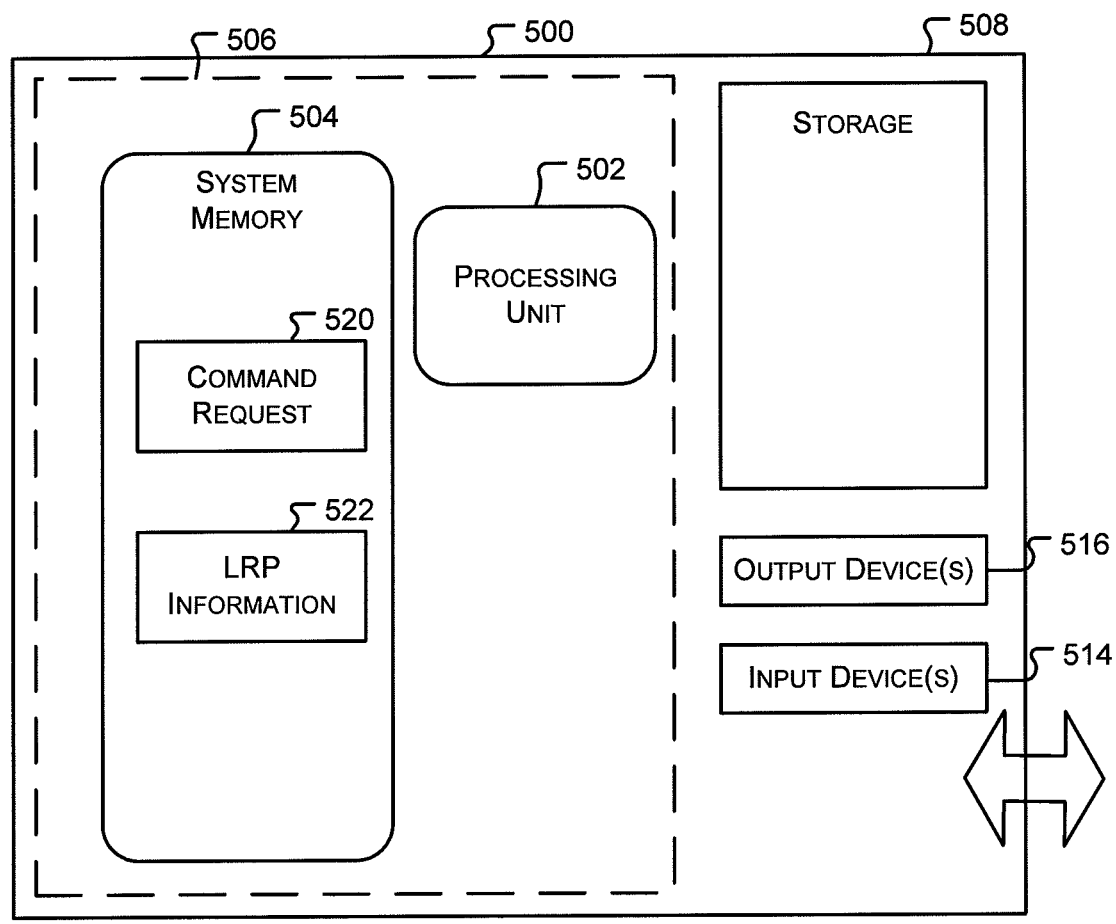
FIG. 5 illustrates a block diagram of a computing environment suitable for implementing embodiments disclosed herein.

FIG. 5 illustrates a general computer system 500, which can be used to implement the embodiments described herein. The computer system 500 is only one example of a computing environment and is not intended to suggest any limitation as to the scope of use or functionality of the computer and network architectures. Neither should the computer system 500 be interpreted as having any dependency or requirement relating to any one or combination of components illustrated in the example computer system 500. In embodiments, system 500 may be used as one or more components of system 100 described above with respect to FIG. 1.

In its most basic configuration, system 500 typically includes at least one processing unit 502 and memory 504. Depending on the exact configuration and type of computing device, memory 504 may be volatile (such as RAM), non-volatile (such as ROM, flash memory, etc.) or some combination. This most basic configuration is illustrated in FIG. 5 by dashed line 506. System memory 504 stores instructions or commands 520, such as the command requests and/or additional parameters associated with the command requests, and data 522 such as the long-running process information that may be stored in a file storage system with storage such as storage 508.

The term computer readable media as used herein may include computer storage media. Computer storage media may include volatile and nonvolatile, removable and non-removable media implemented in any method or technology for storage of information, such as computer readable instructions, data structures, program modules, or other data. System memory 504, removable storage, and non-removable storage 508 are all computer storage media examples (e.g. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computer system 500. Any such computer storage media may be part of computer system 500. Computer system 500 may also have input device(s) 514 such as a keyboard, a mouse, a pen, a sound input device, a touch input device, etc. In another embodiment, the computer system 500 may be coupled to a camera (not shown) that may be operative to record a user and capture motions and/or gestures made by a user. Consistent with other embodiments described herein, the camera may comprise any motion detection device capable of detecting the movement of the user. For example, the camera may comprise a MICROSOFT KINECT motion capture device comprising a plurality of cameras and a plurality of microphones. Output device(s) 516 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments disclosed may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing continuous access to a resource may operate via application-specific logic integrated with other components of the computing device/system 500 on the single integrated circuit (chip).

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

We claim:

1. A method for providing information for a plurality of long-running processes, the method comprising:
   periodically retrieving, via an API, information relating to a plurality of long-running process data fields about the plurality of long-running processes, wherein information about a first long-running process of the plurality of long-running processes is in a first format and wherein information about a second long-running process of the plurality of long-running processes is in a second format, wherein the first format is different from the second format;
   converting, via the API, the information about the first long-running process from the first format into a single, unified format comprising the plurality of long running process data fields;
   converting, via the API, the information about the second long-running process from the second format into the single, unified format, wherein the single, unified format is compatible with a single user interface for displaying the information about the first long-running process and the information about the second long-running process;
   periodically providing, via the API, summary information about at least one of the plurality of long-running processes to the user interface, the summary information including at least a portion of the single, unified formatted information; and
   separately providing, via the API, electronic notifications about the status of at least one of the plurality of long-running processes, the electronic notifications including an actionable link for addressing an error with at least one of the plurality of long-running processes.

2. The method of claim 1, wherein periodically providing summary information comprises providing summary information to the user interface in response to a first command request periodically received from the user interface.

3. The method of claim 2, further comprising providing additional information about the at least one of the plurality of long-running processes to the user interface in response to a second command request received from the user interface.

4. The method of claim 3, wherein both the first command request and the second command request have the same format.

5. The method of claim 4, wherein the second command request includes one or more parameters that correspond to the single, unified formatted information about one or more of the first long-running process or the second long-running processes.

6. The method of claim 1, wherein the electronic notifications are one of (i) an electronic mail message, (ii) a Short Message Service message, or (iii) a Multimedia Message Service message.

7. The method of claim 1, further comprising overwriting the single, unified formatted information in the storage device that exceeds a time threshold.

8. The method of claim 1, wherein the electronic notifications allow a recipient to determine the cause of the error.

9. The method of claim 1, wherein the electronic notifications allow a recipient to restart one or more of the plurality of long-running processes that encountered the error.

10. The method of claim 1, wherein the electronic notifications allow a recipient to start a new long-running process.

11. A computer storage device encoding computer executable instructions that, when executed by at least one processor, performs a method for providing information about a plurality of long-running processes, the method comprising:
   periodically retrieving, via an API, information relating to a plurality of long-running process data fields about the plurality of long-running processes, wherein information about a first long-running process of the plurality of long-running processes is in a first format and wherein information about a second long-running process of the plurality of long-running processes is in a second format, wherein the first format is different from the second format;
   converting, via the API, the information about the first long-running process from the first format into a single, unified format comprising the plurality of long running process data fields;
   converting, via the API, the information about the second long-running process from the second format into the single, unified format, wherein the single, unified format is compatible with a single user interface for displaying the information about the first long-running process and the information about the second long-running process;
   periodically providing, via the API, summary information about at least one of the plurality of long-running processes to the user interface, the summary information including at least a portion of the single, unified formatted information; and
   separately providing, via the API, electronic notifications about the status of at least one of the plurality of long-running processes, the electronic notifications including an actionable link for addressing an error with at least one of the plurality of long-running processes.

12. The computer storage device of claim 11, wherein the electronic notifications are one of (i) an electronic mail message, (ii) a Short Message Service message, or (iii) a Multimedia Message Service message.

13. The computer storage device of claim 11, further comprising overwriting the single, unified formatted information in the storage device that exceeds a time threshold.

14. The computer storage device of claim 11, wherein the storage device is configured to convert the information about the first long-running process and the information about the second long-running process into the single unified format.

15. A computer system for accessing a content item, the system comprising:
   one or more processors; and
   a memory coupled to the one or more processors, the memory for storing instructions which, when executed by the one or more processors, cause the one or more processors to perform a method for providing information about one or more long-running processes, the method comprising:
   periodically retrieving, via an API, information relating to a plurality of long running process data fields about the plurality of long-running processes, wherein information about a first long-running process of the plurality of long-running processes is in a first format and wherein information about a second long-running process of the plurality of long-running processes is in a second format, wherein the first format is different from the second format;
   converting, via the API, the information about the first long-running process from the first format into a single, unified format comprising the plurality of long running process data fields;
   converting, via the API, the information about the second long-running process from the second format into the single, unified format, wherein the single, unified format is compatible with a single user interface for displaying the information about the first long-running process and the information about the second long-running process;
   periodically providing, via the API, summary information about at least one of the plurality of long-running processes to the user interface, the summary information including at least a portion of the single, unified formatted information; and
   separately providing, via the API, electronic notifications about the status of at least one of the plurality of long-running processes, the electronic notifications including an actionable link for addressing an error with at least one of the plurality of long-running processes.

16. The computer system of claim 15, wherein periodically providing summary information comprises providing summary information to the user interface in response to a first command request periodically received from the user interface.

17. The computer system of claim 16, further comprising instructions for providing additional information about the at least one of the plurality of long-running processes to the user interface in response to a second command request received from the user interface.

18. The computer system of claim 17, wherein both of the first command request and the second command request have the same format.

19. The computer system of claim 17, wherein the second command request includes one or more parameters that correspond to the single, unified formatted information about one or more of the first long-running process or the second long-running process.

20. The computer system of claim 15, wherein the electronic notifications are configured such that a recipient may accomplish at least one of: determining the cause of the error, restarting one or more of the plurality of long-running processes that encountered the error, and starting a new long-running process.

\* \* \* \* \*